May 9, 1939. H. V. PHELPS 2,157,942
FOOT ACTUATED SWITCH STRUCTURE
Filed April 5, 1938
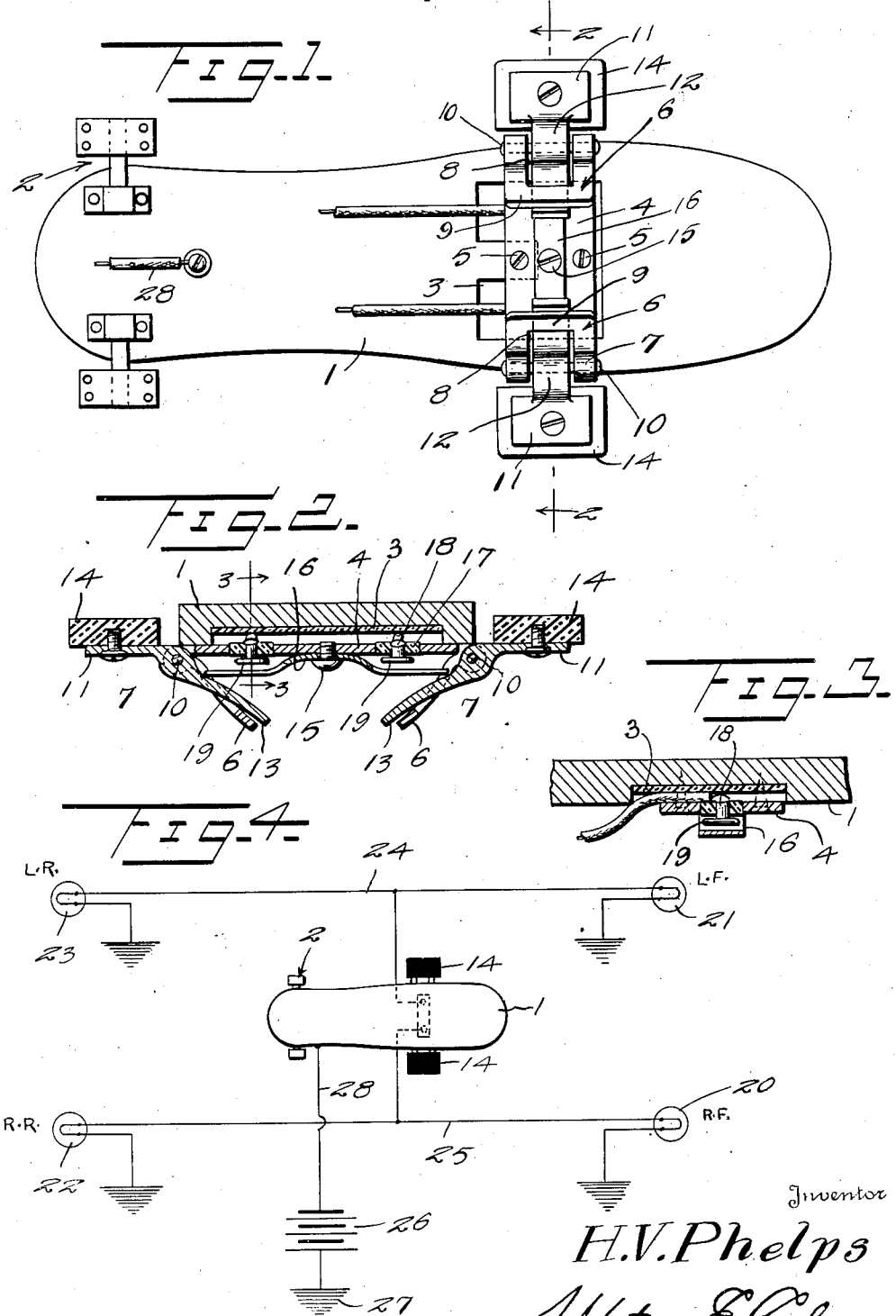
Inventor
H. V. Phelps
By Watson E. Coleman
Attorney Patented May 9, 1939

2,157,942

UNITED STATES PATENT OFFICE 2,157,942

FOOT ACTUATED SWITCH STRUCTURE

Henry V. Phelps, Nitta Yuma, Miss.

Application April 5, 1938, Serial No. 200,221

4 Claims. (Cl. 200—59)

This invention relates to electric circuit controlling means and pertains particularly to a novel combined motor vehicle accelerator pedal and circuit controller.

The invention has for its primary object to provide a novel construction of motor vehicle accelerator pedal carried switch mechanism by means of which the motor vehicle operator may control certain electric circuits of the vehicle, such as signal light circuits, by means of the foot which is resting upon the accelerator pedal and without the necessity of having to shift the foot to any material extent on the pedal in order to bring about the desired switch operation.

Another object of the invention is to provide in association with a motor vehicle accelerator pedal a novel electric circuit controlling switch which is so constructed and arranged with respect to the pedal that manipulation of the switch may be effected by means of the operator's foot resting upon the pedal, without sliding or shifting the foot on the pedal or the necessity of performing any other movement which would tend to remove the driver's attention from the operation of the vehicle.

A still further object of the invention is to provide a novel combined accelerator pedal and electric circuit controlling switch wherein the switch includes a button designed to be engaged by the operator's foot and arranged with respect to the top surface of the accelerator pedal to permit the operator to move his foot upon the pedal when necessary without the possibility of his actuating the switch accidentally.

The invention will be best understood from a consideration of the following detailed description taken in connection with the accompanying drawing forming part of this specification, with the understanding, however, that the invention is not to be confined to any strict conformity with the showing of the drawing but may be modified so long as such changes or modifications mark no material departure from the salient features of the invention as expressed in the appended claims.

In the drawing:

Figure 1 is a view illustrating the improved accelerator pedal and switch structure applied thereto, in bottom plan.

Figure 2 is a section taken upon the line 2—2 of Figure 1.

Figure 3 is a sectional view taken on the line 3—3 of Figure 2.

Figure 4 is a view illustrating diagrammatically the signal system in association with which the present device may be employed.

Referring now more particularly to the drawing, the numeral 1 generally designates an accelerator pedal of the usual type upon which the entire foot of the vehicle operator may be placed, such pedal usually being of metal having a rubber top or tread surface, not shown.

The heel portion of the accelerator is pivotally supported by the supporting trunnions or hinge units 2 such as are shown or by any other suitable means and the forward or toe portion is normally maintained in elevated position by the accelerator rod, not shown.

In carrying out the present invention, the underside of the accelerator pedal 1 is provided with an insulation body 3 in the area which lies beneath the ball of the foot upon the pedal and this insulation body may be countersunk in the under face of the pedal, as shown, so that the hereinafter described parts may engage directly with the metal body of the pedal to form an electric contact therewith.

The numeral 4 designates a terminal supporting grounded metal plate which is secured transversely of the underside of the accelerator pedal by the attaching screws 5 and which, at each of its ends, has a portion reversely bent upon itself providing the obliquely directed and inwardly and downwardly extending ears 6. At the point of joinder between the ears 6 and the plate 4, the plate is formed to provide hinge knuckles 7, the material between these knuckles being cut out and the central portion of each ear also being cut away to form the openings 8, thus providing at the free end of each ear, a transverse bar 9.

Each pair of hinged knuckles 7 supports a pivot pin 10 and supported upon each pivot pin is a plate 11 having a lateral extension formed to provide a hinge knuckle 12 through which the pivot pin extends. Each of the knuckles 12 has extending therefrom the finger 13 which passes through the opening 8 of the adjacent ear and lies across the inner side of the bar portion 9 of the ear between the latter and the plate 4. When the pivotally supported plates 11 are swung to a position where the tongues 13 connected therewith will be in contact with the adjacent bars 9 which operate as stops therefor, they will be in the same plane as the pedal carried ground plate 4, as shown in Figure 2. Each of the plates 11 has secured to its top face a button 14, the top surface of which is disposed slightly below the top surface of the pedal 1 and these buttons are sufficiently spaced from the edges of the pedal to facilitate their ready actuation by tilting the pedal supported foot to the right or to the left, according to the electric circuit which it is desired to close.

At the transverse center of the ground plate 4, a screw 15 secures to this plate a spring strip 16, the outer ends of which are in spaced relation with the plate 4 and contact the top faces of the tongues 13.

Secured in suitable apertures in the ground plate 4 above the ends of the spring strip 16 are insulation disks 17, each of which carries a metallic terminal 18 having a head 19 which lies beneath the plate 4 in a position to be engaged by the adjacent end of the spring strip 16 when the strip is forced upwardly by the oscillation of the tongue 13. Thus, it will be seen that the ends of the spring strip 16 serve the double function of maintaining the actuating tongues 13 in down position so as to hold the switch buttons 14 raised, and establishing an electrical connection between the ground plate 4 and the insulated terminal 18.

In Figure 4 there is shown an electrical diagram to illustrate how the accelerator carried switching mechanism may be employed in association with electric signals of the motor vehicle. In this diagram there are shown right and left front signals 20 and 21 respectively, and right and left rear signals 22 and 23 respectively. The left front and rear signals 21 and 23 are electrically connected by the wire 24 with the terminal 18 at the left side of the accelerator pedal and the front and rear right signals are connected by the wire 25 with the terminal 18 at the right of the accelerator pedal.

The numeral 26 designates the vehicle battery or other source of electric potential, one side of which is granted, as at 27, while the other side is connected by the wire 28 with the metal accelerator pedal body 1 and since the ground plate 4 is also in electrical contact with the pedal, it will be readily seen that an electrical connection is established between the plate 4 and the spring 16 and the car battery.

From the foregoing, it will be readily apparent that when an operator of the vehicle desires to operate either pair of signals while maintaining his foot upon the acelerator pedal, it is not necessary for him to lift his foot to move it to any new position or to slide his foot upon the pedal for the purpose of oscillating the desired switch button 14 but is merely necessary for him to turn his foot either to the right or to the left and by so doing the side edge of the foot will engage and press down upon the selected switch button 14 to effect the upward swinging of the attached finger 13 and the engagement of the adjacent end of the contact spring with the contact or terminal 18 lying thereabove. This will complete an electric circuit including the battery and the pair of signal lamps with which the particular terminal 18 is connected.

By the provision of the rigid apertured ears 6 in which the button operated tongues are disposed, a means is provided for limiting the movement of the tongues under the urge of the spring 16 and the switch mechanism is also protected when the accelerator pedal is forced down, as these ears would engage the underlying vehicle floor board before any of the movable switch parts could be brought into contact therewith.

It will also be noted that by providing the tops of the switch buttons 14 in a plane slightly below the surface of the accelerator pedal, the operator may shift his foot to various positions on the pedal as he may feel inclined without touching either of the switch controlling buttons or being hindered by any of the parts of the circuit controlling device.

I claim:

1. A foot actuated electric circuit controlling means adapted to be carried by an accelerator pedal, comprising a plate designed to be coupled in one side of an electric circuit and to be secured to the underside of said pedal, an oscillatable member carried by the plate and including a button disposed at one side of the pedal and in a plane below the top surface thereof, said oscillatable member carrying a finger extending inwardly and downwardly beneath the pedal, a resilient circuit closing finger carried by and electrically connected with the plate and engaging said member carried finger and constantly urging the member to oscillate in a direction to maintain said button in a predetermined position, and an electric terminal adapted to be secured in the opposite side of an electric circuit and carried by and insulated from said plate and in spaced relation with said contact finger to be engaged by said finger upon oscillation of said member.

2. A foot actuated circuit controller, comprising a flat foot supporting body, a member pivotally attached to said body and carrying a button disposed at one side of the body in a position to be engaged by the side of a foot resting upon the body, an actuating finger forming a part of said member and extending inwardly and downwardly beneath the body, an electric terminal supported by the body and in insulated relation therewith and adapted to be connected in one side of an electric circuit, said terminal being in the plane of oscillation of said finger, a spring contact strip having an end connected with and carried by the body and having its other end engaging said finger between the latter and said terminal, said strip being designed to be carried in the other side of said electric circuit and to be flexed by and upon the oscillation of said finger to be brought into electrical contact with said terminal, and means carried by the body and passing beneath said finger for limiting the movement of the finger away from the body under the action of said spring strip.

3. A circuit controlling means for attachment to a motor vehicle accelerator pedal, comprising a plate secured transversely of the underside of the pedal and having a portion at each end turned back to form inwardly and downwardly extending ear, the said ear at each end of the plate being in the form of a frame, an oscillatable plate mounted upon each end of the first plate and carrying a button spaced from the adjacent side of the pedal, a finger integral with each oscillatable plate and extending inwardly and downwardly beneath the pedal and through the adjacent frame to be limited in its movement in one direction by the frame, an elongated spring strip secured intermediate its ends to said plate and having its free ends engaging said fingers and normally urging the oscillation of the same toward said frames to maintain said buttons in a plane parallel with the top surface of said pedal, said spring strip being designed to be electrically connected with one side of an electric circuit, and a pair of terminals adapted each to be connected in the other side of an electric circuit and carried by and insulated from said first plate, each of said terminals being interposed between the free end of said spring strip and the first plate whereby upon oscillation of the adjacent oscillatable plate the adjacent spring strip will be brought into contact therewith.

4. A foot operated electric circuit controlling means, comprising a flat body upon which the foot may be supported, a pair of terminals carried by said body, one of said terminals being fixed and the other terminal being movable relative thereto, an arm member pivotally supported at one side edge of the body and having a portion extending laterally outwardly therefrom and a portion extending inwardly into operative relation with said movable terminal, means upon the outwardly extending portion of said arm member for engagement by the foot to effect the oscillation of the arm member and the closing of said switch terminals, and said means being disposed in a plane below the surface of the body upon which the foot is placed whereby the foot may have free lateral movement across said surface without striking the said means of the pivoted arm member.

HENRY V. PHELPS.